United States Patent
Chiueh et al.

(10) Patent No.: US 10,210,031 B2
(45) Date of Patent: Feb. 19, 2019

(54) METHOD AND SYSTEM FOR GENERATING QUEUE BASED APPLICATIONS DEPENDENCIES IN VIRTUAL MACHINES

(71) Applicant: INDUSTRIAL TECHNOLOGY RESEARCH INSTITUTE, Hsinchu (TW)

(72) Inventors: Tzi-Cker Chiueh, Taipei (TW); Hao-Cheng Lin, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 146 days.

(21) Appl. No.: 14/983,424

(22) Filed: Dec. 29, 2015

(65) Prior Publication Data

US 2017/0185439 A1    Jun. 29, 2017

(30) Foreign Application Priority Data

Dec. 23, 2015 (CN) .......................... 2015 1 0974631

(51) Int. Cl.
*G06F 9/46* (2006.01)
*G06F 9/455* (2018.01)
(Continued)

(52) U.S. Cl.
CPC ............ *G06F 11/008* (2013.01); *G06F 9/455* (2013.01); *G06F 9/45533* (2013.01);
(Continued)

(58) Field of Classification Search
CPC .. G06F 11/362; G06F 11/3636; G06F 11/364; G06F 11/3644; G06F 11/3668;
(Continued)

(56) References Cited

U.S. PATENT DOCUMENTS 6,760,903 B1    7/2004  Morshed et al.
10,002,526 B1*  6/2018  Dyer ...................... G08C 17/02
(Continued)

FOREIGN PATENT DOCUMENTS

CN    102546090 A    7/2012
CN    102833310 A    12/2012
(Continued)

OTHER PUBLICATIONS

Fatemeh Azmandian et al., "Virtual Machine Monitor-Based Lightweight Intrusion", ACM SIGOPS Operating Systems Review, vol. 45, Issue 2, Jul. 2011, pp. 38-53.
(Continued)

*Primary Examiner* — Charles M Swift
(74) *Attorney, Agent, or Firm* — Rabi & Berdo, P.C.

(57) ABSTRACT

A method and a system for generating queue based applications dependencies in virtual machines are provided. The method includes the following steps. At least one transmitting message transmitted via at least one enterprise service bus by a plurality of application programs is intercepted. The at least one transmitting message includes at least one request message. The at least one request message is obtained by filtering the at least one transmitting message. A client and a server of each of the at least one request message are obtained. A checksum of each of the at least one request message is calculated to obtain a message identification of each of the at least one request message. The client, the server and the message identification of each of the at least one request message are recorded in a dependencies table.

20 Claims, 6 Drawing Sheets

(51) Int. Cl.
  *G06F 11/00* (2006.01)
  *G06F 11/07* (2006.01)
  *G06F 11/32* (2006.01)
  *G06F 11/36* (2006.01)
  *H04L 29/06* (2006.01)
  *G06F 11/22* (2006.01)
  *H04L 29/08* (2006.01)

(52) U.S. Cl.
  CPC .......... *G06F 9/45558* (2013.01); *G06F 11/00* (2013.01); *G06F 11/079* (2013.01); *G06F 11/22* (2013.01); *G06F 11/362* (2013.01); *G06F 11/364* (2013.01); *G06F 11/3636* (2013.01); *G06F 11/3644* (2013.01); *G06F 11/3668* (2013.01); *G06F 11/3672* (2013.01); *H04L 67/10* (2013.01); *H04L 67/42* (2013.01); *G06F 2009/45591* (2013.01)

(58) Field of Classification Search
  CPC .. G06F 11/3672; G06F 9/455; G06F 9/45533; G06F 9/45558; G06F 11/00; G06F 11/008; G06F 11/079; G06F 11/22; G06F 2009/45591
  See application file for complete search history.

(56) References Cited

U.S. PATENT DOCUMENTS

| | | | |
|---|---|---|---|
| 2004/0177141 A1* | 9/2004 | Foody | H04L 41/5054 709/224 |
| 2005/0235044 A1* | 10/2005 | Tazuma | G06F 17/30887 709/217 |
| 2007/0028224 A1 | 2/2007 | Huang | |
| 2009/0024994 A1* | 1/2009 | Kannan | G06F 9/45533 718/1 |
| 2009/0217259 A1 | 8/2009 | Winter et al. | |
| 2009/0307673 A1 | 12/2009 | Eichenberger et al. | |
| 2010/0023926 A1 | 1/2010 | Sugawara et al. | |
| 2010/0030893 A1 | 2/2010 | Berg et al. | |
| 2010/0042789 A1 | 2/2010 | Gonion et al. | |
| 2010/0223609 A1 | 9/2010 | DeHaan et al. | |
| 2011/0041121 A1 | 2/2011 | Schalk | |
| 2011/0067036 A1* | 3/2011 | Hickford | G09B 29/00 719/314 |
| 2011/0154461 A1* | 6/2011 | Anderson | H04L 63/0227 726/7 |
| 2012/0079469 A1 | 3/2012 | Gonion | |
| 2012/0158867 A1* | 6/2012 | Levow | H04L 51/30 709/206 |
| 2012/0210318 A1 | 8/2012 | Sanghvi et al. | |
| 2013/0159999 A1 | 6/2013 | Chiueh et al. | |
| 2013/0179879 A1 | 7/2013 | Zhang et al. | |
| 2014/0165054 A1* | 6/2014 | Wang | G06F 9/45558 718/1 |
| 2014/0281434 A1 | 9/2014 | Madriles et al. | |
| 2015/0281153 A1* | 10/2015 | Murtagh | H04L 51/12 709/206 |
| 2017/0161388 A1* | 6/2017 | Aziz | G06Q 10/109 |

FOREIGN PATENT DOCUMENTS

| | | |
|---|---|---|
| TW | 201032066 A | 9/2010 |
| TW | 201036370 A | 10/2010 |
| TW | 201218687 A | 5/2012 |

OTHER PUBLICATIONS

Li-Juin Wu et al., "Application Dependency Tracing for Message Oriented Middleware", IEICE—Asia-Pacific Network Operation and Management Symposium (APNOMS) 2014, pp. 1-6.

Benjamin H. Sigelman et al., "Dapper, a Large-Scale Distributed Systems Tracing Infrastructure", Google Technical Report dapper-2010-1, Apr. 2010.

Zhikui Wang et al., "AppRAISE: Application-Level Performance Management in Virtualized Server Environments", IEEE Transactions on Network and Service Management, vol. 6, No. 4, Dec. 2009, pp. 240-254.

Xu Chen et al., "Automating Network Application Dependency Discovery: Experiences, Limitations, and New Solutions", OSDI'08 Proceedings of the 8th USENIX conference on Operating systems design and implementation, 2008, pp. 117-130.

Artem Dinaburg et al., "Ether: Malware Analysis via Hardware Virtualization Extensions", CCS '08 Proceedings of the 15th ACM conference on Computer and communications security, 2008, pp. 51-62.

* cited by examiner

METHOD AND SYSTEM FOR GENERATING QUEUE BASED APPLICATIONS DEPENDENCIES IN VIRTUAL MACHINES

This application claims the benefit of People's Republic of China application Serial No. 201510974631.8, filed Dec. 23, 2015, the disclosure of which is incorporated by reference herein in its entirety.

TECHNICAL FIELD

The disclosure relates in general to a method and a system for generating applications dependencies in virtual machines, and more particularly to a method and a system for generating queue based applications dependencies in virtual machines.

BACKGROUND

Enterprise services are usually composed of several service servers. Along with the development of internet and the virtual machine technology, more user applications are performed at a virtual data center (VDC) by the cloud computing technology. The end-user can ask the virtual data center for performing the remote application.

Moreover, distributed application becomes more useful and more complex. The performance degradation or failure of any single service and element will affect the quality of the enterprise services and the customer satisfaction. Due to the requirement of load balance and high availability, the dependency of the application programs in the distributed system always changes. It is very difficult to find out the root cause without an accurate dependencies information. Therefore, how to effectively find out the dependency of the application programs becomes an important issue.

Moreover, many enterprises provide services via queue based applications. Some of them use the enterprise service bus (ESB) to transmit message.

Now, queue based applications are widely used in virtual machine environment. Enterprises need a systematic, low cost and simple method for trouble-shooting.

SUMMARY

The disclosure is directed to a method and a system for generating queue based applications dependencies in virtual machines.

According to one embodiment, a method for generating queue based applications dependencies in virtual machines is provided. The method includes the following steps. At least one transmitting message transmitted via at least one enterprise service bus by a plurality of application programs is intercepted. The at least one transmitting message includes at least one request message. The at least one transmitting message is filtered to obtain the at least one request message, and to obtain a client and a server of each of the at least one request message. A checksum of each of the at least one request message is calculated to obtain a message identification of each of the at least one request message. The client, the server and the message identification of each of the at least one request message are recorded in a dependencies table.

According to another embodiment, a system for generating queue based applications dependencies in virtual machines is provided. The system includes an intercepting unit, a filtering unit, a calculating unit and a table building unit. The intercepting unit is configured to intercept at least one transmitting message transmitted via at least one enterprise service bus by a plurality of application programs. The at least one transmitting message includes at least one request message. The filtering unit is configured to filter the at least one transmitting message to obtain the at least one request message, and to obtain a client and a server of each of the at least one request message. The calculating unit is configured to calculate a checksum of each of the at least one request message to obtain a message identification of each of the at least one request message. The table building unit is configured to record the client, the server and the message identification of each of the at least one request message in a dependencies table.

Figure 1:
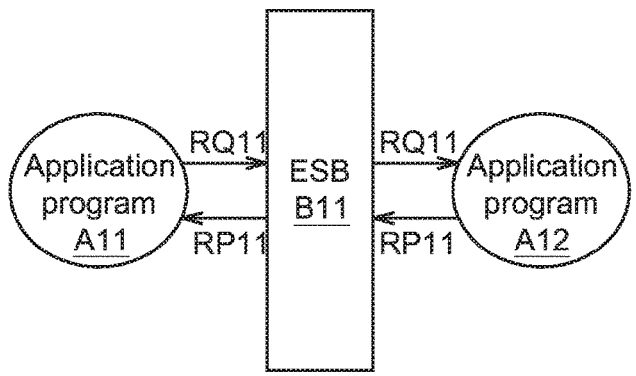
FIG. 1 shows two application programs and an enterprise service bus (EBS) in a 1:1 architecture.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

In this disclosure, at least one request message is intercepted and a checksum of each of the at least one request message is calculated to obtain dependencies among the queue based application programs in virtual machines.

Please refer to FIG. 1. FIG. 1 shows two application programs A11, A12 and an enterprise service bus (EBS) B11 in a 1:1 architecture. The application program A11 sends a request message RQ11 to the enterprise service bus B11, then the application program A12 receives the request message RQ11 from the enterprise service bus B11. For the request message RQ11, the application program A11 is a client, and the application program A12 is a server. On the other hand, the application program A12 sends a reply message RP11 to the enterprise service bus B11, then the application program A11 receives the reply message RP11 from the enterprise service bus B11.

Figure 2:
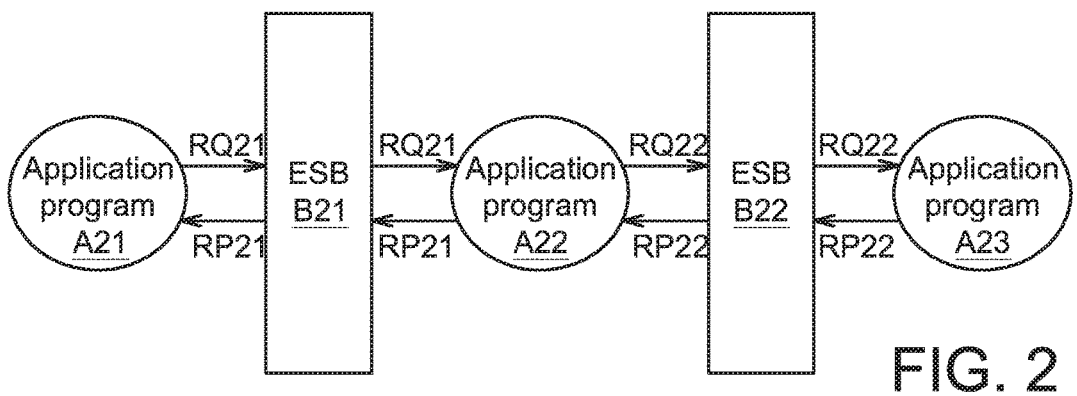
FIG. 2 shows three application programs and two enterprise service buses in a 1:1:1 architecture.

Please refer to FIG. 2. FIG. 2 shows three application programs A21, A22, A23 and two enterprise service buses B21, B22 in a 1:1:1 architecture. The application program A21 sends a request message RQ21 to the enterprise service bus B21, then the application program A22 receives the request message RQ21 from the enterprise service bus B21. For the request message RQ21, the application program A21 is a client, and the application program A22 is a server. The application program A22 sends a request message RQ22 to the enterprise service bus B22, then the application program A23 receives the request message RQ22 from the enterprise service bus B22. For the request message RQ22, the application program A22 is a client, and the application program A23 is a server. On the other hand, the application program A23 sends a reply message RP22 to the enterprise service bus B22, then the application program A22 receives the reply message RP22 from the enterprise service bus B22. The application program A22 sends a reply message RP21 to the enterprise service bus B21, then the application program A21 receives the reply message RP21 from the enterprise service bus B21. In another embodiment, the architecture of FIG. 2 can be extended to be a 1:1:1: . . . :1 architecture.

Figure 3:
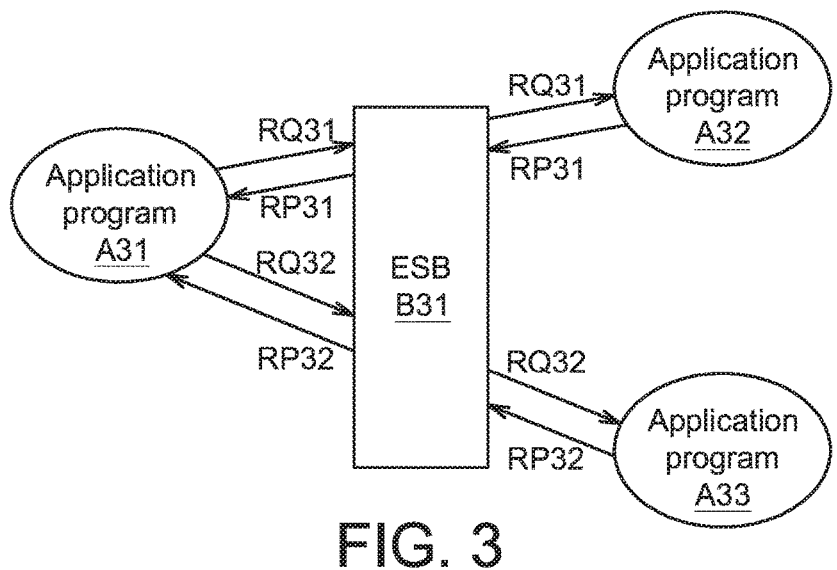
FIG. 3 shows three application programs and one enterprise service bus in a 1:2 architecture.

Please refer to FIG. 3. FIG. 3 shows three application programs A31, A32, A33 and one enterprise service bus B31 in a 1:2 architecture. The application program A31 sends a request message RQ31 and a request message RQ32 to the enterprise service bus B31, then the application program A32 receives the request message RQ31 from the enterprise service bus B31 and the application program A33 receives the request message RQ32 from the enterprise service bus B31. For the request message RQ31, the application program A31 is a client, and the application program A32 is a server. For the request message RQ32, the application program A32 is a client, and the application program A33 is a server. On the other hand, the application program A32 sends a reply message RP31 to the enterprise service bus B31, then the application program A31 receives the reply message RP31 from the enterprise service bus B31. The application program A33 sends a reply message RP32 to the enterprise service bus B31, then the application program A31 receives a reply message RP32 from the enterprise service bus B31. In another embodiment, the architecture of FIG. 3 can be extended to be a 1:n architecture. n is a natural number.

The three kinds of architectures can be combined to form a complex network, such as a 1:1:n architecture. Therefore, the dependencies among the application programs are complex and are difficult to be tracked.

Figure 4A:
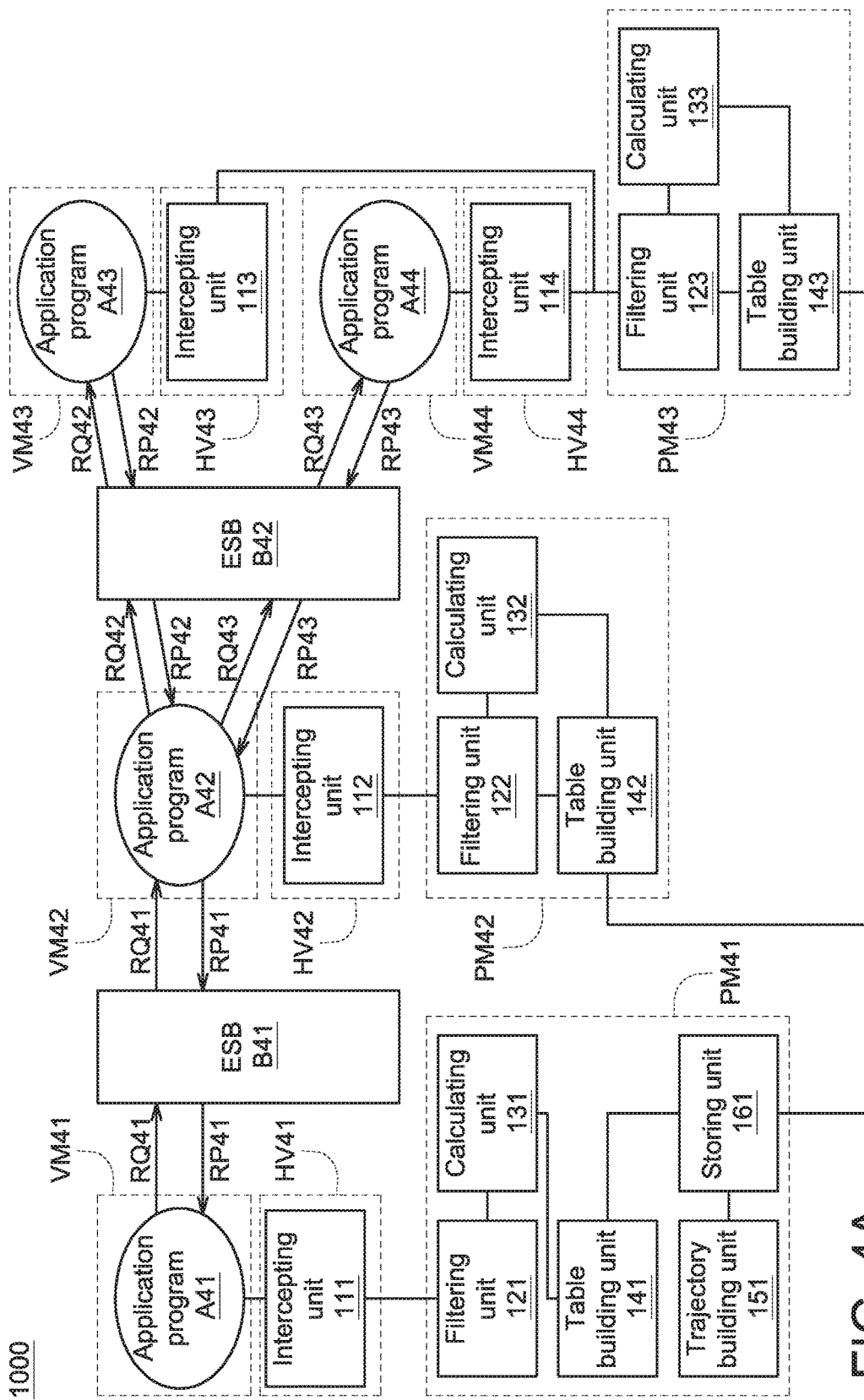
FIGS. 4A and 4B show two systems for generating queue based applications dependencies in virtual machines.
Figure 4B:
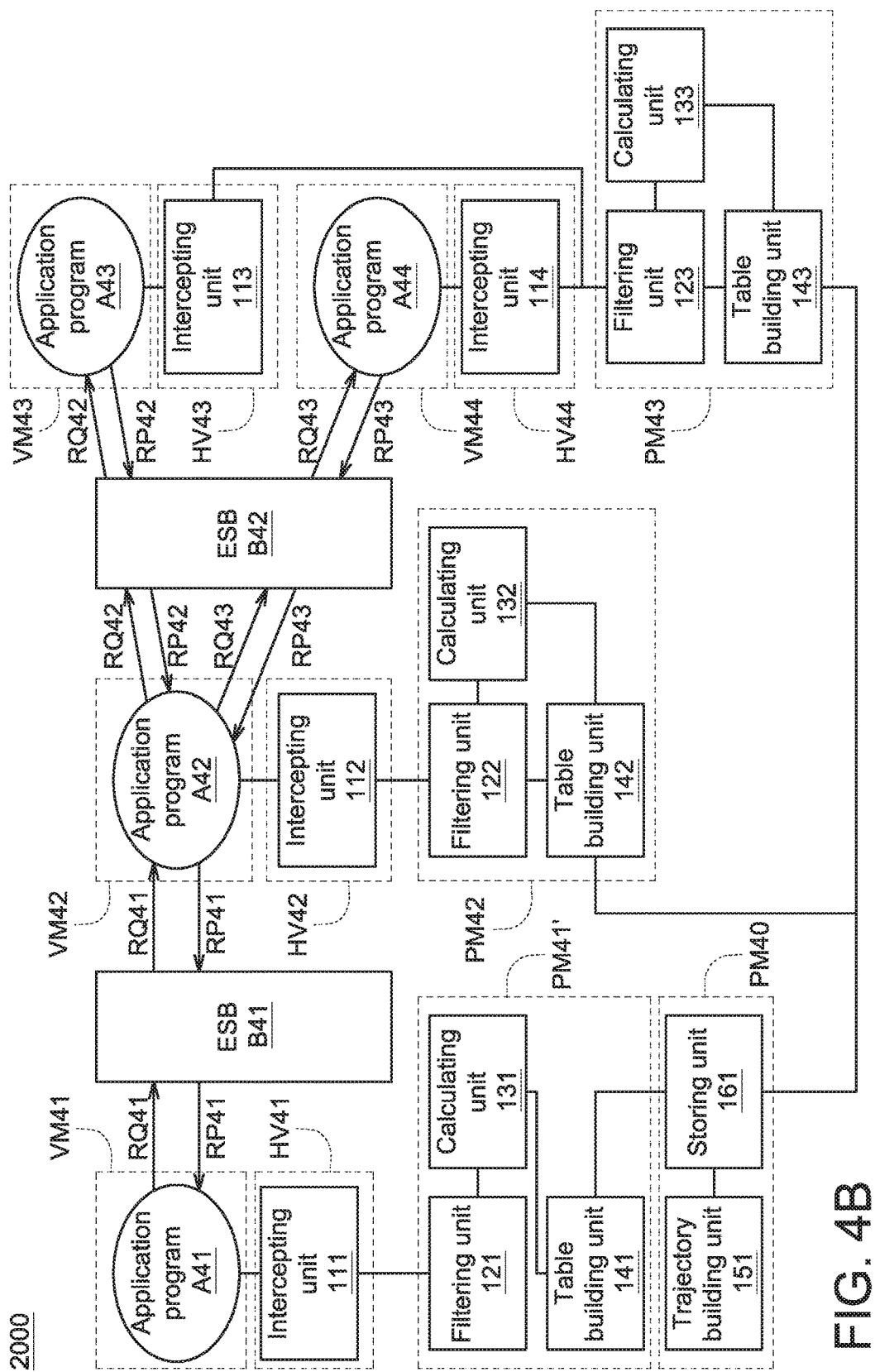

Please refer to FIGS. 4A and 4B. FIGS. 4A and 4B show two systems 100, 2000 for generating queue based applications dependencies in virtual machines. In the embodiment of FIG. 4A, the system 1000 includes a plurality of virtual machines VM41 to VM44, a plurality of hypervisors HV41 to HV44 and a plurality of physical machines PM41 to PM43. A plurality of application programs A41 to A44 are installed on the virtual machines VM41 to VM44 respectively. A plurality of intercepting units 111 to 114 are installed on the hypervisors HV41 to HV44 respectively. The physical machine PM41 includes a filtering unit 121, a calculating unit 131, a table building unit 141, a trajectory building unit 151 and a storing unit 161. The physical machine PM42 includes a filtering unit 122, a calculating unit 132 and a table building unit 142. The physical machine PM43 includes a filtering unit 123, a calculating unit 133 and a table building unit 143.

The intercepting units 111 to 114 are configured to intercept some messages. The filtering units 121 to 123 are configured to filter the messages. The calculating units 131 to 133 are configured to perform some calculating procedures. The table building units 141 to 143 are configured to build or update some tables. The trajectory building unit 151 is configured to track a trajectory. The storing unit 161 is configured to store data. Each of the intercepting units 111 to 114, the filtering units 121 to 123, the calculating units 131 to 133, the table building units 141 to 143 and the trajectory building unit 151 can be but not limited to a circuit, a chip, a circuit board, or a storage device storing a plurality of program codes. The program code could be loaded and executed by a processing unit. The storing unit 161 can be but limited to a disk, a memory, a portable storage device or a cloud storage center.

In the embodiment of FIG. 4A, the virtual machines VM41 to VM44 are disposed on the physical machines PM41 to PM43 respectively. In another embodiment, several virtual machines can be disposed on single physical machine.

Moreover, in the embodiment of FIG. 4A, the storing unit 161 and the trajectory building unit 151 are disposed in the physical machine PM41, the others disposed in the physical machines PM42 to PM43 can link to the physical machine PM41, for communicating with the storing unit 161 and the trajectory building unit 151. In the embodiment of FIG. 4B, the system 2000 includes a plurality of physical machines PM40, PM41', PM42, PM43. The storing unit 161 and the trajectory building unit 151 are disposed in the physical machine PM40. All of the physical machines PM41', PM42, PM43 can link to the physical machine PM40, for communicating with the storing unit 161 and the trajectory building unit 151.

Figure 5:
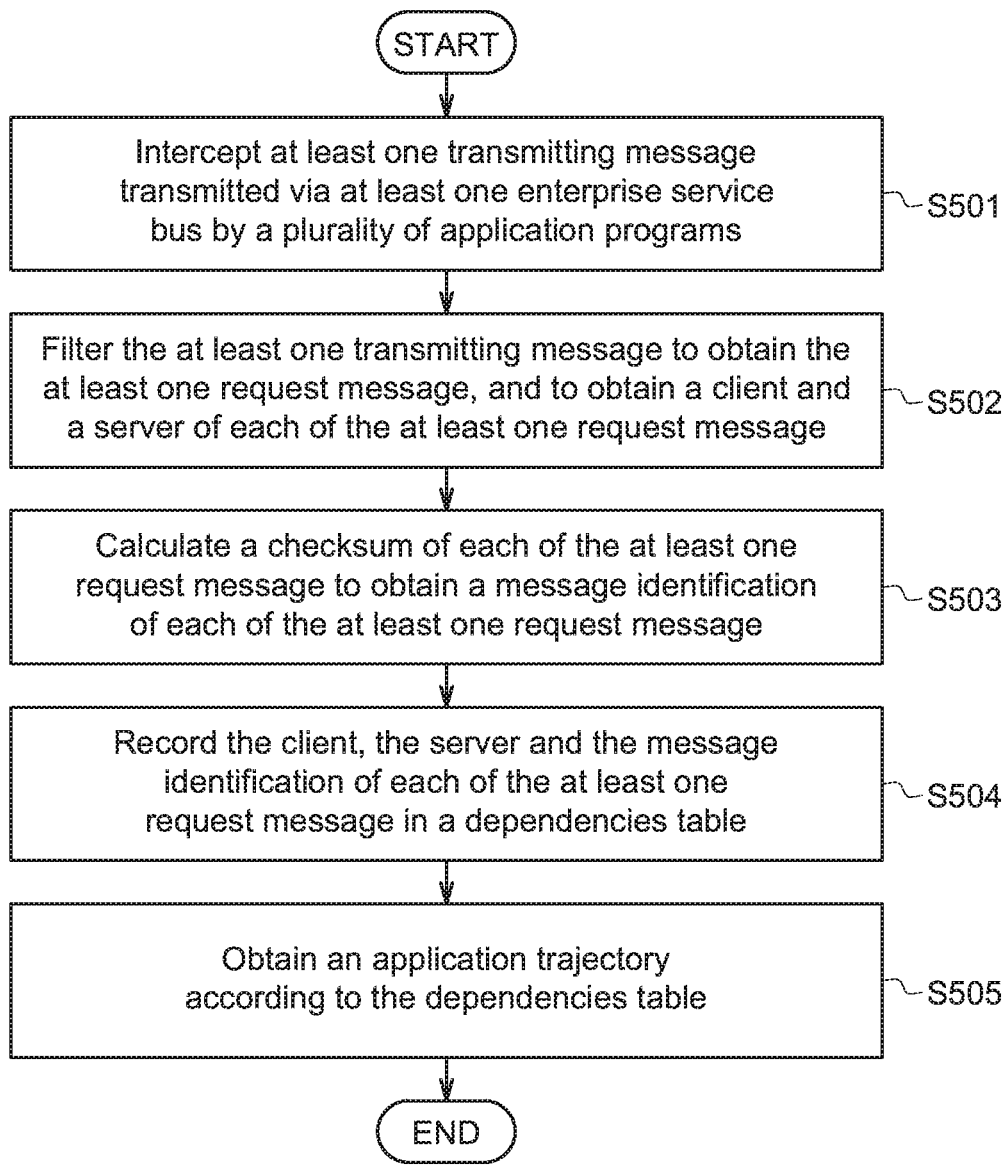
FIG. 5 shows a method for generating queue based applications dependencies in virtual machines.

Please refer to FIG. 5. FIG. 5 shows a method for generating queue based applications dependencies in virtual machines. This method is illustrated with the system 100 of FIG. 4A. In step S501, at least one intercepting unit intercepts at least one transmitting message transmitted via at least one enterprise service bus by a plurality of application programs. For example, the intercepting units 111 to 114 intercept several transmitting messages transmitted via the enterprise service buses B41 to B42 by the application programs A41 to A44. The transmitting messages include the request messages RQ41 to RQ43 and the reply messages RP41 to RP43. In this step, no matter whether each of the transmitting messages is a request message or a reply message, all of the transmitting messages are intercepted and record the time information.

In this step, the request messages RQ41 to RQ43 and the reply messages RP41 to RP43 are intercepted by monitoring a plurality of running threads. As such, the root cause of the failure of the Service Level Agreement (SLA) can be accurately tracked.

In step S502, at least one filtering unit filters the at least one transmitting message to obtain the at least one request message, and to obtain a client and a server of each of the at least one request message. For example, the filtering units 121 to 123 filter the transmitting messages to obtain the request messages RQ41 to RQ43, and to obtain a client and a server of each of the request messages RQ41 to RQ43. In this step, the filtering units 121 to 123 filter the at least one transmitting message according to the time information. In two transmitting messages transmitted between two application programs, the earlier one is deemed as the request message, and the later one is deemed as the reply message.

After the filtering units 121 to 123 filter out the request messages RQ41 to RQ43, the reply messages RP41 to RP43 will be ignored in the later steps.

Next, in step S503, at least one calculating unit calculates a checksum of each of the at least one request message to obtain a message identification of each of the request messages. For example, the calculating units 131 to 133 calculate a checksum of each of the request messages RQ41 to RQ43 to obtain a message identification of each of the request messages RQ41 to RQ43. For example, the message identification may be "RQ41key, RQ42key and RQ43key." In this step, each of the request messages RQ41 to RQ43 includes a fixed information and a variable information, the calculating units 131 to 133 calculate each of the checksums according to each of fixed information. As such, even if the variable information of one request message is changed, the checksum will not be changed. In one embodiment, the calculation of the checksum can be addition, subtraction, multiplication, division, XOR, or a combination thereof.

Afterwards, in step S504, at least one table building unit records the client, the server and the message identification of each of the at least one request message in a dependencies table. For example, the table building units 141 to 143 record the client, the server and the message identification of each of the request messages RQ41 to RQ43 in a dependencies table. Please refer to table 1, which shows an embodiment of the dependencies table. For the request message RQ41, the application program A41 is a client, and the application program A42 is a server. Therefore, the message identification "RQ41key" of the request message RQ41 is recorded in a sending field corresponding the application program A41 and a receiving field corresponding the application program A42. For the request message RQ42, the application program A42 is a client, and the application program A43 is a server. Therefore, the message identification "RQ42key" of the request message RQ42 is recorded in a sending field corresponding the application program A42 and a receiving field corresponding the application program A43. For the request message RQ43, the application program A42 is a client, and the application program A44 is a server. Therefore, the message identification "RQ43key" of the request message RQ43 is recorded in a sending field corresponding the application program A42 and a receiving field corresponding the application program A44.

TABLE 1

| Receiving | application program | Sending | Time information |
|---|---|---|---|
|  | A41 | RQ41key | ... |
| RQ41key | A42 | RQ42key, RQ43key | ... |
| RQ42key | A43 |  | ... |
| RQ43key | A44 |  | ... |

In one embodiment, the table building units 141 to 143 record all of the request messages RQ41 to RQ43 in the same dependencies table. In one embodiment, the dependencies table can be stored in the storing unit 161 of the physical machine PM41 of FIG. 4A. The table building unit 142 of the physical machine PM42 and the table building unit 143 of the physical machine PM43 link to the storing unit 161 of the physical machine PM41 to update the dependencies table. In another embodiment, the dependencies table can be stored in the storing unit 161 of the physical machine PM40 of FIG. 4B.

In one embodiment, the dependencies table can further record a time information of each of at least one request message. As such, the bottleneck can be known by checking the time information, and can be improved accordingly.

Figure 6:
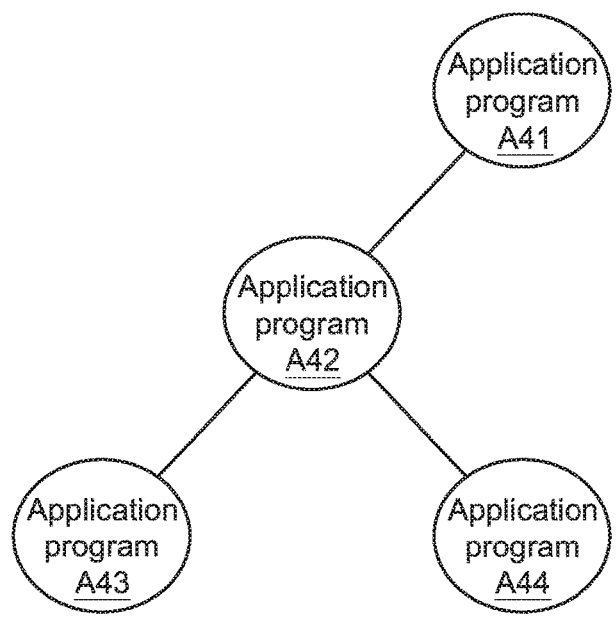
FIG. 6 shows a tree structure of an application trajectory in FIGS. 4A and 4B.

Next, in step S505, at least a trajectory building unit obtains an application trajectory according to the dependencies table. For example, the trajectory building unit 151 obtains the application trajectory according to the dependencies table. Please refer to FIG. 6. FIG. 6 shows a tree structure of the application trajectory in FIGS. 4A to 4B. The trajectory building unit 151 builds the application trajectory which is the tree structure according to a Depth-first search (DFS) algorithm or a Breadth-first Search (BFS) algorithm. As such, the user can easily know the dependencies among the application programs.

Figure 7:
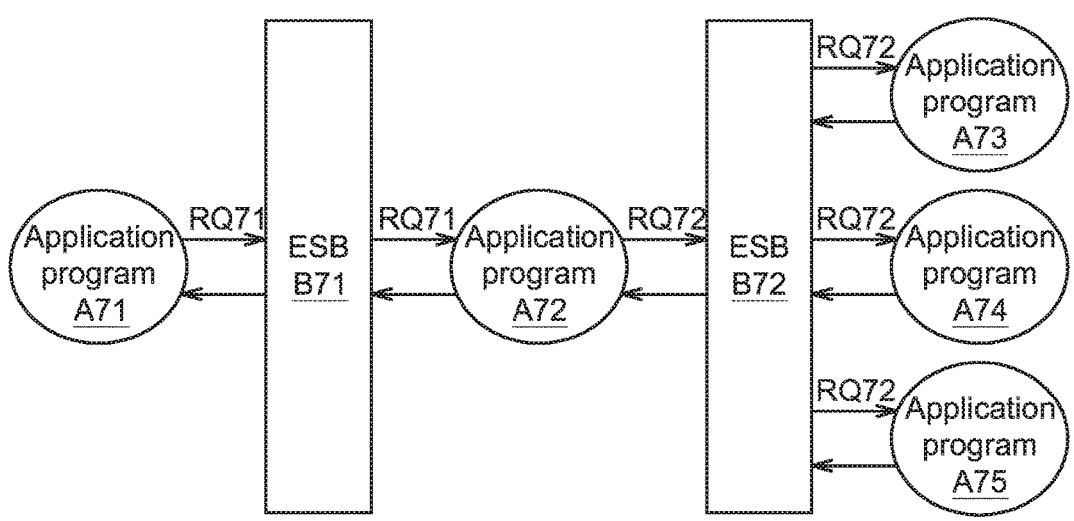
FIG. 7 shows several application programs A71 to A75 according to another embodiment.
Figure 8:
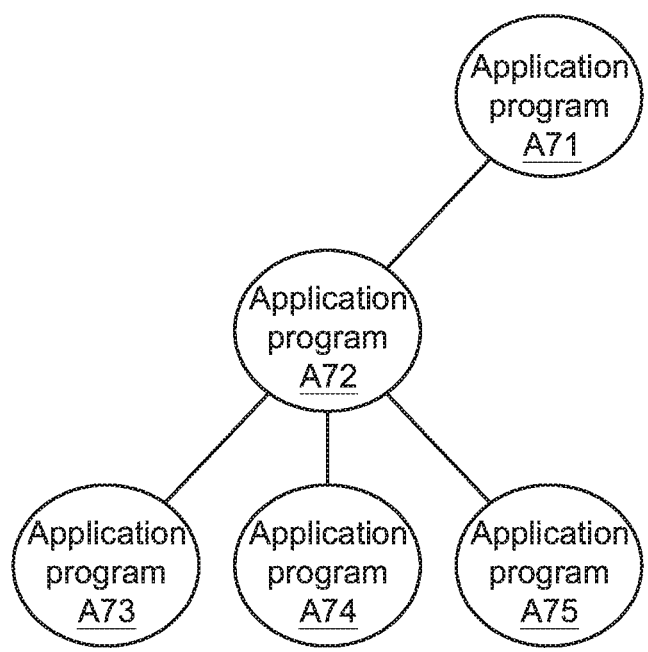
FIG. 8 shows a tree structure of an application trajectory in FIG. 7.

The dependencies table and the corresponding tree structure are illustrated by another embodiment. Please refer to FIGS. 7 and 8. FIG. 7 shows several application programs A71 to A75 according to another embodiment, FIG. 8 shows a tree structure of an application trajectory in FIG. 7. As shown in FIG. 7, the application program A71 sends a request message RQ71 to an enterprise service bus B71, then the application program A72 receives a request message RQ71 from the enterprise service bus B71. For the request message RQ71, the application program A71 is a client, and the application program A72 is a server. The application program A72 sends a request message RQ72 to an enterprise service bus B72, then the application program A73, the application program A74 and the application program A75 receive a request message RQ72 from the enterprise service bus B72. For the request message RQ72, the application program A72 is a client, and each of the application program A73, the application program A74 and the application program A75 is a server.

Please refer to table 2. Table 2 shows a dependencies table according to an embodiment. For the request message RQ71, the application program A71 is a client, and the application program A72 is a server. Therefore, the message identification "RQ71key" of the request message RQ71 is recorded in a sending field corresponding the application program A71 and a receiving field corresponding the application program A72. For the request message RQ72, the application program A72 is a client, and each of the application program A73, the application program A74, and the application program A75 is a server. Therefore, the message identification "RQ72key" of the request message RQ72 is recorded in a sending field corresponding the application program A72 and receiving fields corresponding the application program A73, the application program A74, and the application program A75.

TABLE 2

| Receiving | Application program | Sending | Time information |
|---|---|---|---|
|  | A71 | RQ71key | ... |
| RQ71key | A72 | RQ72key | ... |
| RQ72key | A73 |  | ... |
| RQ72key | A74 |  | ... |
| RQ72key | A75 |  | ... |

As shown in FIG. 8, application trajectory of table 2 can be a tree structure. As such, the user can easily know the dependencies among the application programs.

In step S502, the filtering units 121, 122, 123 can further obtain reply messages RP41, RP42, RP43. And, in step S504, the table building units 141, 142, 143 record a time information and a size information of each of the reply messages RP41, RP42, RP43 in the dependencies table.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for generating queue based applications dependencies in virtual machines, comprising:
   intercepting, by a cloud computing device, at least one transmitting message transmitted via at least one enterprise service bus by a plurality of application programs, wherein whether each of the at least one transmitting message is a request message or a reply message is unknown when each of at least one transmitting message is intercepted;
   determining, by the cloud computing device, whether each intercepted transmitting message is a request message or a reply message;
   based on a result of said determining, filtering out, by the cloud computing device, any intercepted reply message from among the intercepted at least one transmitting message to retain at least one intercepted request message, and to obtain a client and a server of each of the at least one intercepted request message;
   calculating, by the cloud computing device, a checksum of said each of the at least one intercepted request message to obtain a message identification of said each of the at least one intercepted request message; and
   recording, by a storage device, the client, the server, the message identification and a time information of said each of the at least one intercepted request message in a dependencies table, wherein a root cause of a failure is tracked by intercepting the at least one transmitting message, and a bottleneck is known by checking the time information.

2. The method according to claim 1, further comprising:
   obtaining an application trajectory according to the dependencies table.

3. The method according to claim 2, wherein in the step of obtaining the application trajectory, the application trajectory is a tree structure.

4. The method according to claim 3, wherein in the step of obtaining the application trajectory, the tree structure is built according to a Depth-first search (DFS) algorithm or a Breadth-first Search (BFS) algorithm.

5. The method according to claim 1, wherein in the step of intercepting the at least one transmitting message, the at least one transmitting message is intercepted by an intercepting unit of a hypervisor.

6. The method according to claim 1, wherein in the step of intercepting the at least one transmitting message, the at least one transmitting message is intercepted by monitoring a plurality of running threads.

7. The method according to claim 1, wherein in the step of filtering out any intercepted reply message from the at least one transmitting message to retain the at least one intercepted request message, the at least one intercepted request message is retained according to the time information of each of the transmitting message.

8. The method according to claim 1, wherein in the step of calculating the checksum of each of the at least one request message, each of the at least one request message includes a fixed information and a variable information, and the checksum is calculated according to the fixed information.

9. The method according to claim 1, wherein in the step of recording the client, the server and the message identification of said each of the at least one intercepted request message in the dependencies table, the number of the at least one intercepted request message is more than one, all of the intercepted request messages are recorded in the same dependencies table.

10. The method according to claim 1, wherein
    in the step of recording the client, the server, the message identification and the time information of each of the at least one intercepted request message in the dependencies table, and a size information of each of said any intercepted reply message are recorded in the dependencies table.

11. A system for generating queue based applications dependencies in virtual machines, comprising:
    a cloud computing device, including:
    an intercepting unit configured to intercept at least one transmitting message transmitted via at least one enterprise service bus by a plurality of application programs, wherein whether each of the at least one transmitting message is a request message or a reply message is unknown when each of at least one transmitting message is intercepted;
    a filtering unit configured to determine whether each of the intercepted at least one transmitting message is a request message or a reply message, filter out any intercepted reply message from the intercepted at least one transmitting message to retain at least one intercepted request message, and to obtain a client and a server of each of the said at least one intercepted request message; and
    a calculating unit configured to calculate a checksum of each of the said intercepted at least one request message to obtain a message identification of each of the said at least one intercepted request message; and
    a storage device configured to record the client, the server, the message identification and a time information of each of the at least one request message in a dependencies table, wherein a root cause of a failure is tracked by intercepting the at least one transmitting message, and a bottleneck is known by checking the time information.

12. The system according to claim 11, further comprising:
    a trajectory building unit configured to obtain an application trajectory according to the dependencies table.

13. The system according to claim 12, wherein the application trajectory is a tree structure.

14. The system according to claim 13, wherein trajectory building unit builds the tree structure according to a Depth-first search (DFS) algorithm or a Breadth-first Search (BFS) algorithm.

15. The system according to claim 11, wherein the intercepting unit is disposed in a hypervisor.

16. The system according to claim 11, wherein the intercepting unit intercepts the at least one transmitting message by monitoring a plurality of running threads.

17. The system according to claim 11, wherein the filtering unit retains the at least one intercepted request message according to the time information of each of the said at least one transmitting message.

18. The system according to claim 11, wherein said each of the at least one intercepted request message includes fixed information and variable information, and the calculating unit calculates the checksum according to the fixed information.

19. The system according to claim 11, wherein the number of the at least one intercepted request message is more than one, the storage device records all of the request messages in the same dependencies.

20. The system according to claim 11, wherein the storage device further records a size information of said each of the at least one reply message in the dependencies table.

* * * * *